United States Patent [19]

Watkins et al.

[11] Patent Number: 5,458,723
[45] Date of Patent: Oct. 17, 1995

[54] METHOD OF FORMING A STRENGTHENED BOND IN A PAPERBOARD PRODUCT AND PRODUCTS THEREFROM

[75] Inventors: R. Kenneth Watkins, McDonough; James W. Wright, Woodstock, both of Ga.; William J. Culhane, Chillicothe, Ohio

[73] Assignee: The Mead Corporation, Smyrna, Ga.

[21] Appl. No.: 195,973

[22] Filed: Feb. 14, 1994

Related U.S. Application Data

[63] Continuation of Ser. No. 791,083, Nov. 12, 1991, abandoned.

[51] Int. Cl.$^6$ .................................................. B32B 7/00
[52] U.S. Cl. .......................... 156/310; 156/315; 156/334; 229/117.23; 229/198.2; 428/34.2; 428/512; 493/88; 493/128; 524/575
[58] Field of Search ...................... 156/310, 315, 156/334; 428/34.2, 512; 524/575; 229/117.23, 198.2; 493/88, 128

[56] References Cited

U.S. PATENT DOCUMENTS

| | | | |
|---|---|---|---|
| 3,061,167 | 10/1962 | Haack | 229/198.2 |
| 3,923,718 | 12/1975 | Arpin | 524/575 |
| 3,985,937 | 10/1976 | Fife . | |
| 4,249,978 | 2/1981 | Baker | 156/310 |
| 4,396,453 | 8/1983 | Krankkala . | |
| 4,568,714 | 2/1986 | Overholt . | |
| 4,585,501 | 4/1986 | Overholt . | |
| 4,767,390 | 8/1988 | Herring | 493/88 |
| 4,812,496 | 3/1989 | Leadbetter et al. . | |

FOREIGN PATENT DOCUMENTS

| | | | |
|---|---|---|---|
| 49-330 | 1/1974 | Japan | 156/334 |

*Primary Examiner*—John J. Gallagher
*Attorney, Agent, or Firm*—Needle & Rosenberg

[57] ABSTRACT

A method for adhesively bonding opposed paperboard surfaces to each other to form a strengthened bond in a paperboard product and paperboard products formed thereof, comprising the steps of (A) applying a green-strength adhesive to at least a portion of the first paperboard surface; (B) applying a styrene-butadiene latex adhesive or a modified styrene-butadiene latex adhesive as a strengthening adhesive to at least a portion of either the first or the second paperboard surface such that the green-strength adhesive is substantially offset from the strengthening adhesive when the first and second paperboard surfaces are positioned in an opposed relationship; (C) orienting the first and second paperboard surfaces such that they are opposed to each other; and (D) contacting the first and second surfaces together to form the strengthened bond. In addition, there is provided a method for adhesively bonding opposed paperboard surfaces to form a strengthened bond in a paperboard product, and paperboard products formed thereof, by applying a strengthening adhesive consisting essentially of a styrene-butadiene latex adhesive or a modified styrene-butadiene latex adhesive to at least a portion of the first paperboard surface and contacting together the paperboard surfaces to form the strengthened bond.

12 Claims, No Drawings

METHOD OF FORMING A STRENGTHENED BOND IN A PAPERBOARD PRODUCT AND PRODUCTS THEREFROM

This application is a continuation of application Ser. No. 07/791,083, filed November 12, 1991, now abandoned.

BACKGROUND OF THE INVENTION

The present invention relates to a method of producing a paperboard or cardboard product that possesses a strengthened glue joint. In particular, this invention relates to a method, and the paperboard or cardboard products formed thereof, of adhesively bonding opposed paperboard surfaces together by separately applying a styrene-butadiene, or a modified styrene-butadiene, latex adhesive and an adhesive that possesses good green strength, such as a vinyl acetate latex adhesive, to the bonding portion of a paperboard surface. This invention further relates to adhesively bonding opposed paperboard surfaces together by applying a styrene-butadiene, or a modified styrene-butadiene, latex adhesive to the bonding portion of a paperboard surface and to paperboard and cardboard products formed thereof.

Adhesives, such as water glass, hot melt glue, protein glues, vegetable adhesives and synthetic adhesives, are widely used in the fabrication of paperboard and/or cardboard products, such as containers. For instance, starch-based adhesives having various additives such as urea-aldehyde, ketone-aldehyde, urea-formaldehyde or melamine-formaldehyde resins or polyvinyl acetate latex to render the starch-based adhesives more water resistant are disclosed in U.S. Pat. No. 4,396,453.

Styrene-butadiene co-polymer latexes, which are available commercially, have also been utilized in adhesives, coatings and other uses. For instance, U.S. Pat. No. 4,396,453 also discloses a water-resistant starch-based adhesive comprising corn or wheat starch, a carboxylated styrene-butadiene latex, a thickener and a cross-linking agent. U.S. Pat. Nos. 4,584,501, 4,568,714, 4,812,496 and JP 57143371 disclose variations on this starch-based adhesive formulation. That is, incorporation of a protein, such as casein, to provide improved bonding to coated surfaces or to surfaces of low porosity; replacement of the carboxylated styrene-butadiene latex with an ammonia-based latex, such as ammonium based styrene-butadiene latexes and carboxylated styrene-butadiene latexes, to improve the wet-pin strength; and adjustment of the pH to within 4 to 7 with addition of liquid urea resin to provide improved water resistance are disclosed.

Other prior art paperboard adhesive formulations that contain a styrene-butadiene latex can be found in U.S. Pat. No. 3,985,937, which discloses a water-resistant paperboard laminating adhesive comprised of either a polyvinyl acetate or a styrene-butadiene latex emulsion to which clay and other additives, such as paraffin wax and a polyglycol humectant and/or wetting agent, are added, and JP 52133338, which achieves water resistance by combining a wax emulsion with either a polyvinyl acetate emulsion, an alkali starch solution or a styrene-butadiene latex. Japanese patent 139,158/82 discloses that a starch-based adhesive homogenized with polystyrene latex (glass transition temperature 80° C.) has a greater bonding strength compared to the starch-based adhesive homogenized with styrene-butadiene rubber latex (glass transition temperature 20° C.).

Thus, styrene-butadiene latex has been added to other adhesive formulations, such as starch-based formulations, to impart strength and water resistance to the formulation. However, prior to this invention, the use of an adhesive substantially comprised of styrene-butadiene latex in an aqueous carrier, such as an adhesive in which the viscosity is less than 1000 centipoise and in which at least 80% by weight of the solids content comprises styrene-butadiene latex, was not considered suitable as a paperboard adhesive.

Despite the availability of many paperboard adhesives formulated for strength, a common failure point in paperboard products is a glue joint, such as handle glue joints in paperboard sleeve- and basket-style cartons and the like. Thus, the limiting factor in the construction of many paperboard products is the end bond strength of an adhesive. There exists a need, therefore, for an improved paperboard product, and a method of making the same, that possesses strengthened glue joints. There exists a further need for a method of forming paperboard products with strengthened glue joints using high-speed gluing facilities, such as straight-line gluers.

Surprisingly, it has now been found that application of an adhesive consisting primarily of a styrene-butadiene latex (or a modified styrene-butadiene latex) in an aqueous carrier, particularly in combination with the separate application of a green-strength adhesive in a manner such that the green strength adhesive does not substantially overlap the styrene-butadiene latex adhesive in the resulting paperboard product, provides a paperboard glue joint that not only is water resistant but possesses considerably enhanced bonding strength and can be applied using high-speed gluing machinery. Because particular paperboard joints, such as those found in the handles of paperboard cartons, are likely to be the points of failure in a paperboard product, this new discovery not only allows for strengthened paperboard products but also allows for paperboard products constructed from thinner paperboard or recycled paperboard. The enhanced strengthening of the paperboard bond is thought to derive from the penetration of the styrene-butadiene latex adhesive into the paperboard, perhaps forming a composite-like structure with the paperboard.

Furthermore, although separate application of more than one glue to a paperboard surface to form a strengthened adhesive bond is known in the art, the synergistic results of separately applying a styrene-butadiene latex adhesive and a green-strength adhesive as described in this invention are unexpected.

SUMMARY OF THE INVENTION

Thus, according to the present invention, there is provided a method for adhesively bonding opposed paperboard surfaces to each other to form a strengthened bond in a paperboard product, comprising the steps of (A) applying a green-strength adhesive to at least a portion of the first paperboard surface; (B) applying a styrene-butadiene latex adhesive or a modified styrene-butadiene latex adhesive as a strengthening adhesive to at least a portion of either the first or the second paperboard surface such that the green-strength adhesive is substantially offset from the strengthening adhesive when the first and second paperboard surfaces are positioned in an opposed relationship; (C) orienting the first and second paperboard surfaces such that they are opposed to each other; and (D) contacting the first and second surfaces together to form the strengthened bond. Further, the present invention provides for a paperboard product with a strengthened glue joint formed from this method.

In addition, according to the present invention, there is provided a method for adhesively bonding opposed paperboard surfaces to form a strengthened bond in a paperboard product by applying a strengthening adhesive consisting essentially of a styrene-butadiene latex adhesive or a modified styrene-butadiene latex adhesive to at least a portion of the first paperboard surface and contacting together the paperboard surfaces to form the strengthened bond. Further, the present invention provides for a paperboard product with a strengthened glue joint formed from this method.

According to a preferred embodiment of the present invention, a styrene-butadiene latex adhesive having a viscosity of from about 200–300 centipoise and having a ratio of styrene to butadiene from about 40:60 to 70:30, most preferably from about 55:45 to 60:40, is employed as the strengthening adhesive. Preferably, a vinyl acetate latex adhesive is employed as the green-strength adhesive. The green-strength adhesive and the strengthening adhesive are preferably oriented in the resulting paperboard product such that a substantially continuous strip (or strips) of green-strength adhesive is adjacent a substantially continuous strip (or strips) of strengthening adhesive and the two adhesives are positioned so that they do not substantially overlap one another.

DETAILED DESCRIPTION OF THE INVENTION

As used herein, the term "styrene-butadiene latex adhesive" refers to an adhesive in which the viscosity is less than 1000 centipoise and in which 80–100% by weight of the solids content comprises styrene-butadiene latex, which is an emulsion copolymer. The styrene-butadiene latex is present in the adhesive as an aqueous dispersion. As used in this definition, the term "styrene-butadiene latex" refers to a copolymer in which less than 10% by weight of the solids comprises materials other than styrene and butadiene. For instance, additional monomers, such as acrylic or vinylic monomers, preferably acrylic or methacrylic acid or acrylamide or methacrylamide, can be copolymerized with styrene and butadiene.

Similarly, the term "modified styrene-butadiene latex adhesive" refers to an adhesive in which the viscosity is less than 1000 centipoise and in which 80–100% by weight of the solids content comprises a modified styrene-butadiene latex, which is an emulsion copolymer. The modified styrene-butadiene latex is present in the adhesive as an aqueous dispersion. As used in this definition, the term "modified styrene-butadiene latex" refers to a copolymer in which less than 10% by weight of the solids comprises materials other than styrene (or an analog of styrene) and butadiene (or an analog of butadiene). For instance, additional monomers, such as acrylic or vinylic monomers, preferably acrylic or methacrylic acid or acrylamide or methacrylamide can be copolymerized with styrene (or an analog of styrene) and butadiene (or an analog of butadiene). A "styrene analog" is a monomer that, when copolymerized with butadiene or a butadiene analog, produces a latex that functions substantially the same as a styrene-butadiene latex in styrene-butadiene latex adhesive. Examples of styrene analogs include methyl-substituted styrenes or halogen substituted styrenes such as chlorostyrene. A "butadiene analog" is a monomer that, when copolymerized with styrene or a styrene analog, produces a latex that functions substantially the same as a styrene-butadiene latex in styrene-butadiene latex adhesive. Examples of butadiene analogs include isoprene, chloroprene or methyl vinyl ketone.

As used herein, the term "green-strength adhesive" refers to an adhesive that bonds two paperboard surfaces more quickly than a styrene-butadiene latex adhesive. The purpose of a green-strength adhesive is to form an adhesive bond sufficiently strong and in a sufficiently short time to allow a contemporaneously applied styrene-butadiene latex adhesive to set without undue jostling. Examples of green-strength adhesives include water glass or aqueous sodium silicate; hot melt glues, such as polyethylene, paraffin and microcrystalline waxes; protein glues, such as animal glues and casein glue; vegetable adhesives, including those made from starches and dextrin; synthetic adhesives, including vinyl acetate, urea formaldehyde and ethylene vinyl acetate adhesives; and combinations thereof. A preferred green-strength adhesive comprises a vinyl acetate adhesive (polyvinyl acetate).

As used herein, the term "paperboard", unless otherwise indicated, includes both paperboard and cardboard as those terms are used by one skilled in the art. This includes, without limitation, virgin and recycled materials, single and multi-ply materials, coated and uncoated materials, corrugated materials and the like.

In the method of the present invention for adhesively bonding two paperboard surfaces together, a strengthened bond is formed in a paperboard product. The surprisingly superior bonding characteristics of this invention are achieved by separately applying both a green-strength adhesive and a styrene-butadiene latex adhesive or a modified styrene-butadiene latex adhesive as a strengthening adhesive to the bonding portion of one paperboard surface followed by contacting both paperboard surfaces together to form the strengthened bond. Alternatively, the green-strength adhesive may be applied to one paperboard surface and the styrene-butadiene latex adhesive or modified styrene-butadiene latex adhesive can be applied to the other paperboard surface. This method is particularly effective when the adhesives are applied by high speed gluing machines, such as straight-line gluers capable of forming over 40,000 paperboard products per hour.

It has been discovered that styrene-butadiene latex, rather than simply being incorporated as an ingredient in an adhesive formulation to impart better characteristics to that formulation, can advantageously comprise at least 80% of the solids content, preferably greater than 90%, most preferably greater than 95% of the solids content of a paperboard adhesive. Thus, although the resulting styrene-butadiene latex adhesive does not possess superior green strength, a formulation comprising these high amounts of styrene-butadiene latex (or modified styrene-butadiene latex) is capable of interacting with the paperboard to provide a surprisingly superior end bond strength.

Factors that affect the resulting end bond strength of a styrene-butadiene latex adhesive (or modified styrene-butadiene latex adhesive) include the viscosity of the adhesive, which in turn, is affected by a number of factors, including the percent solids content, pH, latex particle size distribution, and identity and amount of additives such as tackifiers or thickening agents. As the viscosity of the styrene-butadiene latex adhesive increases, the resulting end bond strength decreases with preferred viscosity ranging from about 200 to 300 centipoise. Thus, it appears that the end bond strength depends on the degree of penetration of the styrene-butadiene latex adhesive into the paperboard.

One skilled in the art is capable of varying the factors that affect viscosity to optimize the performance of the styrene-butadiene latex adhesive. For instance, as the percent solids content in the adhesive increases, the amount of styrene-butadiene latex per given bonding area increases, which increases the resultant end bond strength. However, increasing the percent solids content tends to increase the viscosity, which can lower the resultant end bond strength. The preferred range of percent solids content ranges from about 40% to 55% solids in a aqueous dispersion with 45% to 52% solids in an aqueous dispersion being most preferred.

Another factor that affects the resultant end bond strength of the styrene-butadiene latex adhesive is the amount of adhesive that is applied per unit bonding area. Because the viscosity of the styrene-butadiene latex adhesive is low compared to conventional adhesives, the adhesive is able to penetrate into the paperboard; however, if thicker paperboard is used, more adhesive may be necessary to achieve appropriate bonding. While the viscosity, and especially the solids content, affects how much styrene-butadiene latex binder is present in any given area, the amount of adhesive applied can also be varied by changing the physical processes employed in applying the glue. For instance, for adhesive applied as a substantially continuous strip on the surface of the paperboard, such as with a straight-line gluer, it may be necessary to apply two or more strips of adhesive, either on top of or positioned adjacent to the first strip to attain the desired end bonding strength. Additionally, the pressure used to apply the adhesive and the glue gun nozzle size can be varied to maximize the end bonding strength.

The styrene monomer to butadiene monomer ratio in the latex particles can be varied to maximize bonding characteristics. The preferred styrene:butadiene ratio ranges from about 40:60 to about 70:30, most preferably from about 55–60% styrene.

The styrene-butadiene latex adhesive can be applied to the surface of the paperboard using any appropriate conventional gluer; however, a straight-line gluer is preferred.

After the styrene-butadiene latex (or modified styrene-butadiene latex) adhesive has been applied to one paperboard surface and contact has been made with the opposing paperboard surface, the glue joint is permitted to set with a minimum of mechanical jostling so as to provide for strong end bonding strength. Preferably, a conventional adhesive that possesses good green strength is applied concurrently, or nearly so, with the styrene-butadiene latex adhesive to bond the two paperboard surfaces together quickly. Thus, the green-strength adhesive bond immobilizes the glue joint sufficiently to permit the styrene-butadiene latex adhesive to set without being disturbed mechanically.

The strengthening adhesive and the green-strength adhesive must be applied to the paperboard surface in such a manner that there is no substantial overlap or intermingling of the two adhesives in the resulting strengthened bond to obtain full advantage of the strengthening characteristics of the styrene-butadiene latex adhesive; substantial mixing of the two adhesives results in a substantially weakened end bonding strength. Presumably, mixing of the two adhesives prevents appropriate penetration of the styrene-butadiene latex adhesive into the paperboard. Furthermore, because the two adhesives do not substantially overlap, solvent systems can be optimized for each adhesive individually.

Although the two adhesives must not overlap substantially, they can be applied in close proximity to each other. For instance, when a paperboard glue joint is formed with a straight-line gluer, glue guns can be positioned to deliver streams of adhesive $1/16$ of an inch apart as measured perpendicularly to the resulting adhesive strips. The styrene-butadiene adhesive strip may contact the edge of the green-strength adhesive strip and there may be minor intermingling of the two adhesives. However because the two adhesive strips do not substantially overlap, the end bond strength advantages of the present invention can be obtained.

Use of a green-strength adhesive in conjunction with styrene-butadiene latex (or modified styrene-butadiene latex) adhesive as described above synergistically provides for an increased end bond strength compared to the use of either of the adhesives alone. Most preferably, styrene-butadiene latex adhesive (55–60% styrene; 200–300 centipoise; aqueous dispersion) and vinyl acetate latex adhesive are applied by a straight-line gluer (0.017 inch nozzle; 13–16 lbs pressure and 0.015 inch nozzle; 40–50 lbs pressure, respectively) to form a strengthened glue joint in an 18 point paperboard product.

The instant invention can be used to strengthen any glue joint in a paperboard product. Obviously, glue joints in a paperboard product that are subjected to greatest stress under normal use can be strengthened most advantageously by this method. In particular, the handle glue joint in paperboard products, such as paperboard sleeve-type and basket-type cartons for beverage containers in which the handle is formed by adhesively adhering one paperboard surface to another, is subjected to greater stress more often than other glue joints in the carton. Typical examples of a sleeve-type beverage carton and a basket-type beverage carton may be seen in U.S. Pat. Nos. 4,216,861 and 4,450,956, respectively, which are specifically incorporated herein by reference. Upon adhering the handle components of these products using the instant method, the overall strength of the paperboard product is so increased that the thickness of the paperboard employed can be reduced significantly without sacrificing the quality of the resulting product. Furthermore, in addition to strengthening conventional paperboard products, the instant invention allows for the formation of paperboard products constructed from thinner paperboard or recycled paperboard that are equivalent in overall strength to conventional products.

A paperboard product can be tested to determine its overall strength and its areas of weakness using several industry-standard tests. For example, an integrity test determines the amount of force required to rupture the package by placing stress on critical areas, such as the bottom, handle, riser panels, ends and the like. In this test, an integrity testing machine exerts tension on critical areas of a properly loaded paperboard product until failure occurs and/or the force gauge begins to decline in pressure reading. The amount of pressure the paperboard product sustained and the area at which failure occurred is recorded.

Similarly, the drop test determines the area of failure on a package when the package is subjected to a 1½ inch mechanical drop. In this test, a paperboard product, such as a beverage carton, is loaded with the appropriate full containers. After being attached to the drop test machine, the package is cycled through 1½ inch drops until the package fails or it reaches 100 cycles without failure. The number of cycles completed by each package before failure and the area in which failure occurred is recorded.

Both of these tests are typically performed under both wet and dry conditions. For dry testing, packages are conditioned for 24 hours under the standard condition of 50%±2% relative humidity and 73.4°±1.8° F. Wet packages are tested after soaking them in water for three minutes at a temperature of 72°±3° F. Thus, these tests can be used to test the glue joints, including handles, of paperboard products to determine their end bond strength.

When wet and dry paperboard products having glue joints produced according to this invention were tested in integrity and drop tests, the joints performed extremely well compared to those formed conventionally. The present invention is more particularly described in the following examples which are intended as illustrative only since numerous modifications and variations therein will be apparent to those skilled in the art.

EXAMPLE 1

21 point paperboard sleeve-type beverage cartons were constructed as described below using a straight-line gluer to form the handle joints. All other glue joints were formed conventionally. A set of control cartons were manufactured by adhering the handle paperboard surfaces together with 2 strips of plant glue (vinyl acetate adhesive). The strips of plant glue were applied from two glue guns positioned so as to produce adhesive strips offset 1/16 of an inch, center to center, from each other on the paperboard surface. Similarly, a second set of cartons were manufactured by adhering the handle paperboard surfaces together with 2 strips of plant glue positioned as in the control group but with a strip of styrene-butadiene latex adhesive positioned directly on top of the strips of plant glue. The styrene-butadiene latex adhesive consisted of a 50%±½% solids content aqueous dispersion of 57:43 styrene to butadiene copolymer latex particles with small amounts of bactericide and stabilizer (VW24, Mead Ink Products, Anniston, Ala.) (hereinafter SB latex). A third set of cartons were manufactured by adhering the handle paperboard surfaces together with 2 strips of plant glue positioned as in the control group but with a strip of SB latex positioned so as to produce a SB latex strip offset 1/16 of an inch, center to center, from one of the plant glue strips. The plant glue (~1100 centipoise) was applied through a 0.015 inch nozzle at 40-45 lbs pressure. The SB latex adhesive (200-300 centipoise) was applied through a 0.017 inch nozzle at 15 lbs pressure. Glue joints formed in this manner comprised adjacent strips of glue which, although they contacted each other at their edges, were substantially offset from each other.

Cartons from the control batch, the "on top" batch, and the "side-by-side" batch were randomly chosen to be tested, both wet and dry, in the integrity test and the drop test. The following results represent the average values for five cartons tested in each manner.

TABLE 1

|  | DRY DROP | WET DROP | DRY INTEGRITY | WET INTEGRITY |
| --- | --- | --- | --- | --- |
| Control | 8 | 12.6 | 46 | 50 |
| On Top | 21.8 | 38.4 | 54 | 57.5 |
| Side-By-Side | 96.2 | 100 | 75 | 75 |

Thus, application of the SB latex so that it does not substantially overlap the green-strength adhesive (plant glue) markedly increases the end bond strength of the glue joint relative to a bond formed from the application of the SB latex on top of the green-strength adhesive and, most particularly, relative to the green-strength conventional adhesive bond.

EXAMPLE 2

Similar to Example 1, a set of control paperboard sleeve-type beverage cartons were constructed using 21 point paperboard and plant glue applied to the bonding portion of the paperboard surface in two strips positioned 1/16 of an inch offset from each other to form the handle glue joint. A second set of paperboard cartons were constructed according to this invention using thinner 18 point paperboard and one strip of plant glue offset 1/16 of an inch from one strip of SB latex adhesive to adhere the handle surfaces together. All other glue joints were formed conventionally. Other application conditions are the same as given in Example 1.

Cartons from the 21-point control batch and the 18-point test batch were randomly chosen to be tested, both wet and dry, in the integrity test and the drop test. The following results represent the average values for ten cartons tested in each manner.

TABLE 2

|  | DRY DROP | WET DROP | DRY INTEGRITY | WET INTEGRITY |
| --- | --- | --- | --- | --- |
| 21 Point | 5.2 | 21.9 | 45 | 39.5 |
| 18 Point | 75.1 | 57.1 | 72.5 | 63.25 |

Thus, although 21 point paperboard is typically used in conventional paperboard cartons, the above results show that thinner paperboard bonded according to the instant invention, can produce an 18-point paperboard product that is substantially stronger than a conventionally bonded 21-point paperboard product.

EXAMPLE 3

Using the construction and testing conditions given in Example 1, 21-point paperboard sleeve-type beverage cartons were fabricated using (1) one strip SB latex, (2) two strips plant glue (offset by 1/16 inch) and (3) one strip SB latex and two strips plant glue (all offset by 1/16 inch). The following results represent the average values for ten cartons tested in the drop test.

TABLE 3

|  | DRY DROP | WET DROP |
| --- | --- | --- |
| SB Latex (one strip) | 27 | 74 |
| Plant Glue (two strips) | 8 | 12 |
| SB Latex (one strip) + Plant Glue (two strips) | 96 | 100 |

Thus, the separate application of SB latex adhesive with plant glue as given in the instant invention synergistically strengthens the glue joint as compared to the application of SB latex or plant glue individually.

EXAMPLE 4

Using the construction and testing conditions similar to Example 1, 18-point paperboard sleeve-type beverage cartons were fabricated according to the invention using one strip SB latex and two strips plant glue (offset by 1/16 inch). A second batch of cartons were fabricated identically except that the viscosity of the SB latex adhesive was increased to about 1100–1300 centipoise. The following results represent the average values over ten cartons tested in both the drop test and the integrity test for these cartons.

TABLE 4

|  | DRY DROP | WET DROP | DRY INTEGRITY | WET INTEGRITY |
| --- | --- | --- | --- | --- |
| 200–300 | 75.1 | 57.1 | 72.5 | 63.25 |

TABLE 4-continued

| | DRY DROP | WET DROP | DRY INTEGRITY | WET INTEGRITY |
|---|---|---|---|---|
| 1100–1300 | 6 | 8 | 45 | 43 |

Thus, as the viscosity of the SB latex adhesive increases, the end bond strength of bonds formed according to the invention decreases.

Numerous modifications and variations of the present invention are possible in light of the above teachings. It is therefore to be understood that within the scope of the appended claims, the invention may also be practiced otherwise than as specifically described herein.

What is claimed is:

1. A method for adhesively bonding opposed first and second paperboard surfaces to form a strengthened bond in a paperboard product, comprising the steps of:
   (a) applying a green-strength adhesive to at least a portion of the first paperboard surface;
   (b) applying an emulsion copolymer strengthening adhesive to at least a portion of the selected first or second paperboard surface such that the green-strength adhesive is offset from the strengthening adhesive when the first and second paperboard surfaces are positioned in an opposed relationship, wherein the strengthening adhesive comprises a styrene-butadiene latex adhesive or a modified styrene-butadiene latex adhesive and wherein the viscosity of the strengthening adhesive is less than 1000 centipoise;
   (c) orienting the first and second paperboard surfaces such that they are opposed to each other; and
   (d) contacting together the first and second surfaces to form the strengthened bond.

2. The method of claim 1, wherein the strengthening adhesive comprises a styrene-butadiene latex adhesive.

3. The method of claim 2, wherein the ratio of styrene monomers to butadiene monomers in the styrene-butadiene latex adhesive is from about 40:60 to 70:30.

4. The method of claim 2, wherein the ratio of styrene monomers to butadiene monomers in the styrene-butadiene latex adhesive is from about 55:45 to 60:40.

5. The method of claim 1, wherein the viscosity of the styrene-butadiene latex adhesive ranges from about 200 to 300 centipoise.

6. The method of claim 1, wherein the green-strength adhesive is selected from the group consisting of water glass, a hot melt glue, a protein glue, a vegetable adhesive and a synthetic adhesive.

7. The method of claim 1, wherein the green-strength adhesive comprises polyvinyl acetate.

8. The method of claim 1, wherein the green-strength adhesive is applied so as to form a substantially continuous strip on the first paperboard surface and the strengthening adhesive is applied so as to form a substantially continuous strip on the selected first or second paperboard surface such that the green-strength adhesive strip is adjacent to and substantially offset from the strengthening adhesive strip in the strengthened bond.

9. The method of claim 1, wherein the paperboard product is a carton having a handle formed by the strengthened bond.

10. The method of claim 1, wherein the paperboard thickness ranges from about 16 point to 27 point.

11. The method of claim 1, wherein the paperboard is 18 point paperboard.

12. A method for adhesively bonding opposed first and second paperboard surfaces to form a strengthened bond in a paperboard product, comprising the steps of;
   (a) applying a green-strength adhesive to at least a portion of the first paperboard surface;
   (b) applying an emulsion copolymer strengthening adhesive to at least a portion of the selected first or second paperboard surface such that the green-strength adhesive is offset from the strengthening adhesive when the first and second paperboard surfaces are positioned in an opposed relationship, wherein the strengthening adhesive consists essentially of a styrene-butadiene latex adhesive or a modified styrene-butadiene latex adhesive and wherein the viscosity of the strengthening adhesive is less than 1000 centipoise;
   (c) orienting the first and second paperboard surfaces such that they are opposed to each other; and
   (d) contacting together the first and second surfaces to form the strengthened bond.

* * * * *